US012632370B2

(12) United States Patent
Hamada

(10) Patent No.: US 12,632,370 B2
(45) Date of Patent: May 19, 2026

(54) SECRET DECISION TREE TEST APPARATUS, SECRET DECISION TREE TEST SYSTEM, SECRET DECISION TREE TEST METHOD, AND PROGRAM

(71) Applicant: NTT, Inc., Tokyo (JP)

(72) Inventor: Koki Hamada, Tokyo (JP)

(73) Assignee: NTT, Inc., Tokyo (JP)

( * ) Notice: Subject to any disclaimer, the term of this patent is extended or adjusted under 35 U.S.C. 154(b) by 625 days.

(21) Appl. No.: 18/044,503

(22) PCT Filed: Oct. 16, 2020

(86) PCT No.: PCT/JP2020/039124
§ 371 (c)(1),
(2) Date: Mar. 8, 2023

(87) PCT Pub. No.: WO2022/079908
PCT Pub. Date: Apr. 21, 2022

(65) Prior Publication Data
US 2023/0325304 A1      Oct. 12, 2023

(51) Int. Cl.
| | |
|---|---|
| *G06N 20/00* | (2019.01) |
| *G06F 11/3668* | (2025.01) |
| *G06F 11/3698* | (2025.01) |
| *G06N 3/08* | (2023.01) |
| *G06N 20/20* | (2019.01) |

(52) U.S. Cl.
CPC ...... *G06F 11/3698* (2025.01); *G06F 11/3696* (2013.01)

(58) Field of Classification Search
None
See application file for complete search history.

(56) References Cited

U.S. PATENT DOCUMENTS

2023/0034384 A1* 2/2023 Mao ..................... H04L 9/3213

OTHER PUBLICATIONS

Gangrade et al: ("Privacy Preserving Two-Layer Decision Tree Classifier for Multiparty Databases", Women in Research 2016, vol. 1, No. 1, Sep. 1, 2012 , hereinafter Gangrade) (Year: 2012).*
(Continued)

*Primary Examiner* — Samuel D Fereja
(74) *Attorney, Agent, or Firm* — IPUSA, PLLC

(57)      ABSTRACT
A secret decision tree test device configured to evaluate a division condition at each of a plurality of nodes of a decision tree when learning of the decision tree is performed by secret calculation, the secret decision tree test device includes a memory; and a processor configured to execute inputting a numerical attribute value vector composed of specific numerical attribute values of items of data included in a data set for learning of the decision tree, a label value vector composed of label values of the items of the data, and a group information vector indicating grouping of the items of the data into the nodes; and calculating, using the numerical attribute value vector, the label value vector, and the group information vector, first to fourth frequencies, to evaluate the division condition using the first to fourth frequencies.

7 Claims, 3 Drawing Sheets

(56)         References Cited

OTHER PUBLICATIONS

Alka Gangrade et al: "Privacy Preserving Two-Layer Decision Tree Classifier for Multiparty Databases", Women in Research 2016, vol. 1, No. 1, Sep. 1, 2012 (Sep. 1, 2012), pp. 77-82, XP055534527, 2 Penn Plaza, Suite 701 New York NY 10121-0701 USA DOI: 10.1145/2909067.2909097 ISBN: 978-1-4503-4278-0.

Koji Chida, Koki Hamada, Dai Ikarashi, Katsumi Takahashi, "Reconsideration of Light-Weight Verifiable Three-Party Secret Function Calculation," In CSS, 2010.

* cited by examiner

SECRET DECISION TREE TEST APPARATUS, SECRET DECISION TREE TEST SYSTEM, SECRET DECISION TREE TEST METHOD, AND PROGRAM

TECHNICAL FIELD

The present invention relates to a secret decision tree test device, a secret decision tree test system, a secret decision tree test method, and a program.

BACKGROUND ART

As a method of obtaining a specific operation result without restoring encrypted numerical values (for example, NPL 1), a method called secret calculation has been known. In the method described in NPL 1, by performing encryption in which numerical fragments are distributed to three secret calculation devices, and having three secret calculation devices perform cooperative calculation, results of addition/subtraction, constant addition, multiplication, constant multiplication, a logical operation (negation, logical AND, logical OR, exclusive OR), data format conversion (integers and binary digits), and the like can be obtained in a state of being distributed to the three secret calculation device without restoring numerical values.

Meanwhile, when learning a decision tree from a given data set, a method of calculating an evaluation value when the data set is divided at each node by the attribute value of each item of data and adopting division that maximizes the evaluation value has been well known.

CITATION LIST

Non Patent Literature

[NPL 1] Koji Chida, Koki Hamada, Dai Ikarashi, Katsumi Takahashi, "Reconsideration of Light-Weight Verifiable Three-Party Secret Function Calculation," In CSS, 2010

SUMMARY OF INVENTION

Technical Problem

However, in a case where learning of a decision tree is performed by secret calculation, the calculation time may increase. For example, in a case where a data set composed of n items of data is divided by a decision tree having m nodes, $\Theta(mn)$ evaluations (tests) are required in order to conceal the number of items of data classified at each node when evaluation values are calculated at all the nodes. Furthermore, in a case where the attribute is a numerical attribute, there is a maximum of n ways to determine a threshold value for classification, and hence, it is necessary to perform evaluations (tests) of $\Theta(mn^2)$ as a whole.

One embodiment of the present invention was made in view of the above points, and has an object to reduce the calculation time in a case where learning of a decision tree is performed by secret calculation.

Solution to Problem

In order to achieve the above object, a secret decision tree test device according to an embodiment configured to evaluate a division condition at each of a plurality of nodes of a decision tree when learning of the decision tree is performed by secret calculation, the secret decision tree test device, includes: an input unit configured to input a numerical attribute value vector composed of specific numerical attribute values of items of data included in a data set for learning of the decision tree, a label value vector composed of label values of the items of the data, and a group information vector indicating grouping of the items of the data into the nodes; a frequency calculation unit configured to calculate, using the numerical attribute value vector, the label value vector, and the group information vector, a first frequency of data belonging to each group, a second frequency of data for each of the label values in said each group, a third frequency of data belonging to a division group obtained by dividing said each group by a division condition indicating comparison between the numerical attribute value and a threshold value, and a fourth frequency of data for each of the label values in the division group; and an evaluation calculation unit configured to calculate an evaluation value for evaluating the division condition using the first frequency, the second frequency, the third frequency, and the fourth frequency.

Advantageous Effects of Invention

It is possible to reduce the calculation time in a case where learning of a decision tree is performed by secret calculation.

DESCRIPTION OF EMBODIMENTS

Figure 1:
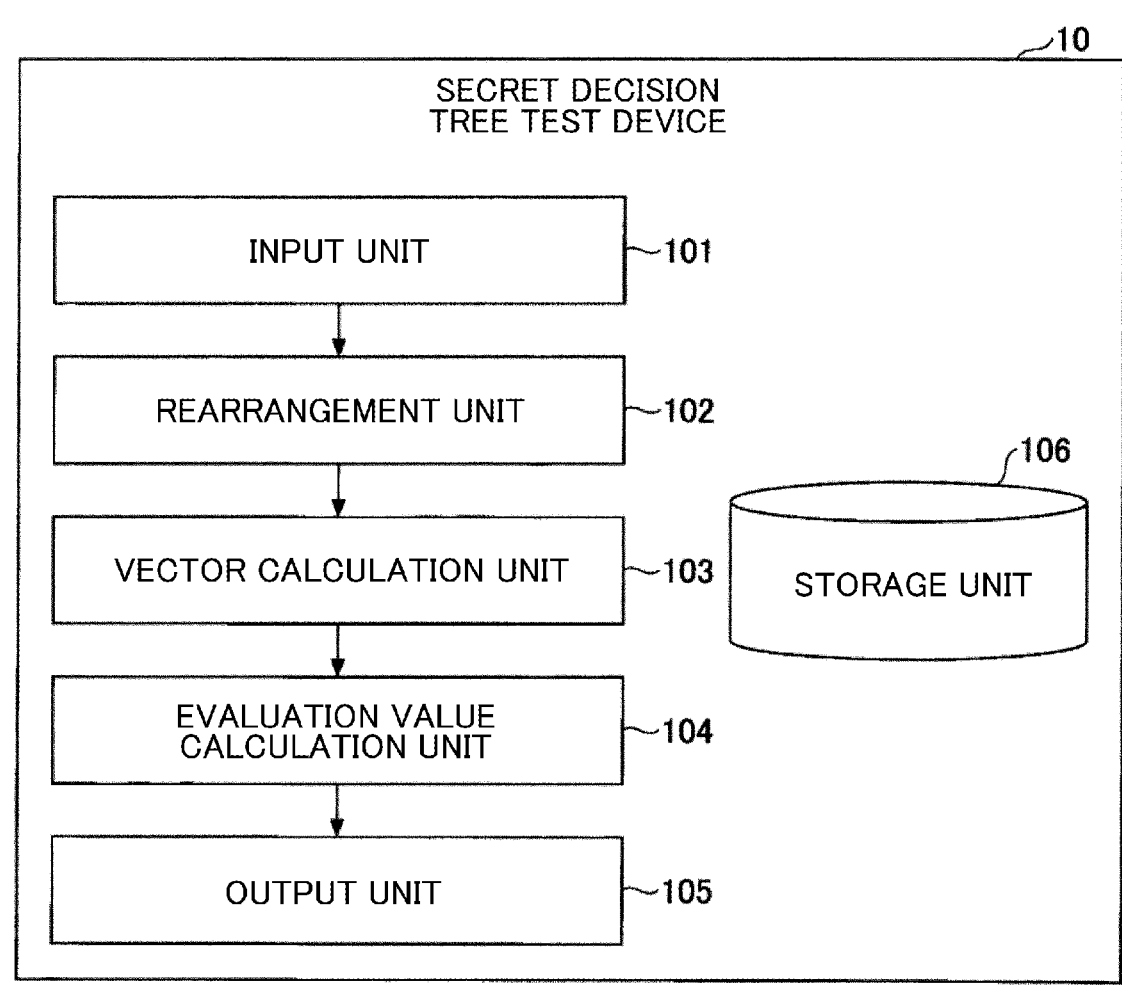
FIG. 1 is a diagram illustrating an example of a functional configuration of a secret decision tree test device according to a present embodiment.

Hereinafter, an embodiment of the present invention will be described. In the present embodiment, a secret decision tree test device 10 capable of efficiently performing evaluation (a test) at each node for an attribute taking a numerical value when learning of a decision tree is performed by secret calculation (that is, when learning of a decision tree is performed without revealing input and output) will be described. The secret decision tree test device 10 according to the present embodiment can reduce the total calculation time by collectively calculating evaluation values of a plurality of division conditions at each node of a decision tree as will be described later. Note that, in the present embodiment, a decision tree in which input and output are concealed using secret calculation is also referred to as a secret decision tree.

Notation

First, various notations will be described. Note that notations which are not necessarily used in the present embodiment are also described below.

A value obtained by concealing a certain value a through encryption, secret sharing, or the like is called a secret value of a, and is denoted as [a]. In a case where a is concealed by secret sharing, [a] refers to a set of fragments of secret sharing which are possessed by each secret calculation device.

Restoration

A process of inputting the secret value [a] of a and calculating a value c having a relation of c=a is denoted as follows:

c←Open([a])

Arithmetic Operations

Operations of addition, subtraction, and multiplication take the secret values [a] and [b] of two values a and b as inputs, and calculate the secret values $[c_1]$, $[c_2]$, and $[c_3]$ of calculation results $c_1$, $c_2$, and $c_3$ of a+b, a−b, and ab. Execution of the operations of addition, subtraction, and multiplication are denoted, respectively, as follows:

$$[c_1] \leftarrow Add([a], [b])$$

$$[c_2] \leftarrow Sub([a], [b])$$

$$[c_3] \leftarrow Mul([a], [b])$$

In a case where there is no concern of misunderstanding, Add([a], [b]), Sub([a], [b]), and Mul([a], [b]) are abbreviated as [a]+[b], [a]−[b], and [a]×[b], respectively.

Comparison

Operations of comparison take the secret values [a] and [b] of two values a and b as inputs, and calculate the secret values $[c_1]$, $[c_2]$, and $[c_3]$ of a Boolean value $c \in \{0, 1\}$ of a=b, a≤b, and a<b. The Boolean value is 1 when it is true and 0 when it is false. Execution of the comparison operations of a=b, a≤b, and a<b are denoted, respectively, as follows:

$$[c_1] \leftarrow EQ([a], [b])$$

$$[c_2] \leftarrow LE([a], [b])$$

$$[c_3] \leftarrow LT([a], [b])$$

Selection

An operation of selection takes the secret value [c] of a Boolean value $c \in \{0, 1\}$ and the secret values [a] and [b] of two values a and b as inputs, and calculates the secret value [d] of d satisfying the following formula.

$$d = \begin{cases} a & \text{if } c = 1 \\ b & \text{otherwise} \end{cases} \qquad \text{[Math. 1]}$$

The execution of this operation is denoted as follows:

$$[d] \leftarrow IfElse([c], [a], [b])$$

This operation can be implemented as follows:

$$[d] \leftarrow [c] \times ([a] - [b]) + [b]$$

<Decision Tree>

A decision tree is a directed graph that expresses knowledge about a certain attribute of data by a combination of rules with a tree structure. In addition, such attributes include an attribute called an objective variable and an attribute called an explanatory variable, and the decision tree uses the attribute value of an explanatory variable as an input and predicts and outputs the attribute value of an objective variable. The decision tree includes one or more nodes, and each node other than a leaf is set with a division rule (division condition) regarding explanatory variables such as, for example, "age is less than 30 years." On the other hand, the attribute value of an objective variable is set in a leaf (that is, a node at an end of the decision tree).

In response to receiving an attribute value of the explanatory variable, the decision tree first determines a division condition at the node of the root, and then, transitions to one of the child nodes in accordance with the determination result of the division condition. Thereafter, determination of a division condition at each node and transition to the child node are recursively repeated, and an attribute value allocated to the finally reached leaf is output as the prediction value of the objective variable.

Learning Algorithm of Decision Tree

For example, CART, ID3, C4.5, and the like are known as algorithms for learning a decision tree from a set of data composed of explanatory variables and objective variables. Although these algorithms differ in detail, these all learn a decision tree by recursively dividing a data set so as to greedily maximize a certain objective function from the root to the leaves (Steps 1 to 8 to be described later). In addition, an input to the algorithm is a data set Q=(X, y), and an output is a decision tree represented as a directed graph from the root to the leaf. Hereinafter, each item of data included in the data set is also referred to as a record. Note that, for example, the data set may be referred to as "data set for training" or "teaching data set," and each item of data included in the data set may be referred to as "training learning", "teaching data", or the like.

Here, X is a matrix having attribute values of the explanatory variables of each record as elements, and is represented by, for example, a matrix in which the total number of records is the number of rows and the total number of explanatory variables is the number of columns. In addition, y is a vector having attribute values of the objective variables of each record as elements, and is represented by, for example, a vertical vector in which the attribute value of the objective variable of the n-th record of X is an n-th element.

Note that, as described above, a division condition is set at each node other than a leaf of the decision tree, and an attribute value of the objective variable is set at a leaf. In addition, it is assumed that the objective variable takes category values and the explanatory variable takes category values, the objective variable is also referred to as a label, and its value (attribute value) is also referred to as a label value. The decision tree in a case where the objective variable is a numerical value is also called a regression tree.

Step 1: a node v is created.

Step 2: when the end condition of division is satisfied, the attribute value of the objective variable is set at the node v, and output as a leaf, and the process ends. In this case, the attribute value (label value) which is set at the node v is, for example, a value that appears most frequently among the values of the elements included in y. Note that examples of the end condition include all the elements included in y having the same value (that is, all the attribute values of the objective variables being the same), the decision tree having reached a height determined in advance, and the like.

Step 3: when the end condition of division is not satisfied, division conditions $r_1$, $r_2$, . . . that can be applied to the node v are listed.

Step 4: an evaluation value $s_i$ of each division condition $r_i$ is calculated by the objective function.

Step 5: the division condition r* that takes the maximum evaluation value is selected from the set {r_i} of division conditions, and the division condition r* is set at the node v.

Step 6: a data set (X, y) is divided into data sets (X_1, y_1), (X_2, y_2) ... (X_d, y_d) on the basis of the division condition r*. In other words, this means that records included in the data set (X, y) are classified into the data sets (X_1, y_1), (X_2, y_2) ..., (X_d, y_d) on the basis of the division condition r*. Note that d is the number of branches (that is, the number of children held by one node).

Step 7: Steps 1 to 7 are recursively executed for each (X_j, y_j). That is, each (X_j, y_j) is regarded as (X, y), and a function, a method, or the like of executing Steps 1 to 7 is called. Here, when a node v is created in Step 1 executed recursively, a branch is spanned with the node v created in the calling Step 1. Note that the node v created in the calling Step 1 is a parent, and the node v created in the called Step 1 is a child.

Step 8: when the execution of Steps 1 to 7 for all the data sets y) is ended (that is, the execution of all Steps 1 to 7 called recursively is ended), the set of nodes v (and the division condition r set at each node v) and the set of branches between the nodes are output, and the process ends. The set of these nodes v and the set of branches are the decision tree.

Number of Branches

Although the number of branches d can be any integer value greater than or equal to 2, in the present embodiment, a binary tree is assumed and d=2 is set. Note that, although the present embodiment can also be applied to a case where d is greater than or equal to 3, the calculation time becomes longer as the value of d increases.

Division Condition

Although any condition for the attribute value of the explanatory variable can be used as the division condition, in general, a condition such as magnitude comparison or inclusion in a certain set is often used. In the present embodiment, since the explanatory variable takes a numerical value, the division condition is based on magnitude comparison with respect to a threshold value (for example, C is a threshold value, x is a numerical attribute value of an explanatory variable, and x≤C, or the like). Note that the division condition may be referred to as, for example, a division rule, a classification condition, a classification rule, or the like.

Index of Purity

As an index for measuring the quality of division (or classification) when a certain data set is divided into a plurality of data sets (in other words, records included in a certain data set is classified into a plurality of data sets), an index of purity H(•) indicating whether the data set is ambiguous has been known. Examples of indices which are often used include a gini coefficient, entropy, and the like.

In the data set Q, a set of records in which the attribute value (that is, label value) of the objective variable is k is denoted as Q_k. In this case, the ratio of records of the label value k at a node that takes the data set Q as input is defined as follows:

$$p_k := \frac{|Q_k|}{|Q|}$$ [Math. 2]

Furthermore, in the embodiment, entropy defined as follows, $$H(Q) = -\sum_k p_k \log_2 p_k$$ [Math. 3]

is used as the index of purity.

Objective Function

The quality of each division condition is evaluated by the objective function (that is, the value of the objective function is the evaluation value of the division condition). Examples of the objective function which are often used include an amount of mutual information, a gain factor, and the like.

It is assumed that, denoting a division condition as θ, the data set Q is divided into two data sets Q(θ, 0) and Q(θ, 1), under a certain division condition θ. In this case, GainRatio( ) defined by the following formula is called a gain factor.

$$p_i(Q, \theta) := \frac{|Q(\theta, i)|}{|Q|}$$ [Math. 4]

$$G(Q, \theta) := \sum_i p_i(Q, \theta) H(Q(\theta, i))$$

$$\text{Gain}(Q, \theta) := H(Q) - G(Q, \theta)$$

$$SplitInfo(Q, \theta) := -\sum_i p_i(Q, \theta) \log_2 p_i(Q, \theta)$$

$$GainRatio(Q, \theta) := \frac{\text{Gain}(Q, \theta)}{SplitInfo(Q, \theta)}$$

In the present embodiment, the gain factor is used as an objective function.

<Calculation of Evaluation Value>

The division condition of each node is set by selecting such a division condition that a predetermined objective function is maximized at the node. Since it is necessary to calculate the value of the objective function for each candidate for the division condition, it is important to be able to efficiently calculate the value of the objective function for the given division condition.

The gain factor defined by Math. 4 needs to be calculated intricately to obtain the frequency of the value of each label (the value of the objective variable) after the division has been performed actually. Consequently, in the present embodiment, a method of calculating a gain factor is reformulated and simplified so that the gain factor can be collectively calculated for a plurality of division conditions by secret calculation.

In order to simplify the calculation of the gain factor, attention is focused on many ratios being required for the gain factor. Since a ratio requires division, the calculation cost is increased when the calculation is performed as it is; however, it can be converted into a statistic easy to calculate such as frequency by multiplying by the total number. Based on this observation, in the present embodiment, the functions of SplitInfo⁺, H⁺, Gain⁺, and G⁺ multiplied by the size of the input data set are used instead of the functions of SplitInfo, H, Gain, and G.

For simplicity, when using the following formula, $$f(x) := x \log_2 x$$ [Math. 5]

SplitInfo$^+$ can be reformulated as follows:

$$SplitInfo^+(Q, \theta) := |Q|SplitInfo(Q, \theta) \qquad \text{[Math. 6]}$$

$$= -\sum_i |Q(\theta, i)|\log_2(|Q(\theta, i)|/|Q|)$$

$$= -\sum_i |Q(\theta, i)|(\log_2|Q(\theta, i)| - \log_2|Q|)$$

$$= |Q|\log_2|Q| - \sum_i |Q(\theta, i)|\log_2|Q(\theta, i)|$$

$$= f(|Q|) - \sum_i f(|Q(\theta, i)|)$$

Similarly, H$^+$ can be reformulated as follows:

$$H^+(Q) := |Q|H(Q) \qquad \text{[Math. 7]}$$

$$= -|Q|\sum_k p_k\log_2 p_k$$

$$= -\sum_k |Q_k|(\log_2|Q_k| - \log_2|Q|)$$

$$= |Q|\log_2|Q| - \sum_k |Q_k|\log_2|Q_k|$$

$$= f(|Q|) - \sum_k f(|Q_k|)$$

Similarly, G$^+$ can be reformulated as follows:

$$G^+(Q, \theta) := |Q|\sum_i p_i(Q, \theta)H(Q(\theta, i)) \qquad \text{[Math. 8]}$$

$$= \sum_i |Q(\theta, i)|H(Q(\theta, i))$$

$$= \sum_i H^+(Q(\theta, i))$$

In addition, similarly, Gain$^+$ can be reformulated as follows:

$$Gain^+(Q, \theta) := |Q| \, Gain \, (Q, \theta) \qquad \text{[Math. 9]}$$

$$= |Q|H(Q) - |Q|G(Q, \theta)$$

$$= H^+(Q) - G^+(Q, \theta)$$

All the above functions of SplitInfo$^+$, H$^+$, Gain$^+$, and G$^+$ are composed of frequency such as the number of records included in the data set Q or the number of records satisfying a certain condition in the data set Q, f(•), and addition/subtraction. Since GainRatio is as follows, $$GainRatio(Q, \theta) = \frac{|Q| \, Gain \, (Q, \theta)}{|Q|SplitInfo(Q, \theta)} = \frac{Gain^+(Q, \theta)}{SplitInfo^+(Q, \theta)} \qquad \text{[Math. 10]}$$

it can be understood that the numerator and denominator of GainRatio of the division condition $\theta$ for the data set Q can be ultimately calculated by the following four quantities:

(1) the number of records $|Q|$ of Q;

(2) the number of records $|Q_k|$ of a label value k in Q;

(3) the number of records $|Q(\theta, i)|$ of each item of data set obtained by dividing Q by $\theta$; and (4) the number of records $|Q(\theta, i)_k|$ of the label value k in each item of data set obtained by dividing Q by $\theta$, together with f(•) and addition/subtraction.

The input of f(•) is one of the above-described four frequencies (the numbers of records $|Q|$, $|Q_k|$, $|Q(\theta, i)|$, and $|Q(\theta, i)_k|$). Therefore, in a case where the number of records of the data set given as data set for learning is n, the input of f(•) is always an integer 0 or greater and n or less. Thus, in a case where concealment is performed by secret sharing, f(•) can implement $\Theta(n)$ calculations of f(•) with the amount of communication of O(n log n) by using a secret batch mapping using a correspondence table (look-up table) listing the following correspondence of the magnitude $\Theta(n)$.

$$[0, n] \ni x \longmapsto x\log x \qquad \text{[Math. 11]}$$

Thereby, in the present embodiment, by calculating each frequency at each node when learning the secret decision tree, it is possible to collectively calculate the evaluation values (GainRatio) of a plurality of division conditions at each node.

In addition, the result of comparison of two values (a, b) and (c, d) each given as a pair of a numerator and a denominator being non-negative is equal to the result of comparison of ad and bc. Since both the numerator and denominator of GainRatio are non-negative, division is avoided by substituting the above method when comparison of GainRatio (that is, comparison of the evaluation values) is performed. Thereby, it is possible to reduce the calculation time required for the comparison of the evaluation values for selecting the division condition that takes the maximum evaluation value.

<Functional Configuration>

Next, a functional configuration of the secret decision tree test device 10 according to the present embodiment will be described with reference to FIG. 1. FIG. 1 is a diagram illustrating an example of the functional configuration of the secret decision tree test device 10 according to the present embodiment.

As shown in FIG. 1, the secret decision tree test device 10 according to the present embodiment includes an input unit 101, a vector calculation unit 103, an evaluation value calculation unit 104, an output unit 105, and a storage unit 106.

The storage unit 106 stores various types of data (that is, various types of concealed data) for learning a secret decision tree. Here, it is assumed that these various types of data include a data set given as a data set for learning and a group information vector indicating which node a certain numerical attribute value is classified (that is, grouped) into. In addition, it is assumed that the data set is composed of a numerical attribute value vector having the numerical attribute value of each record as an element and a label value vector having the label value of each record as an element. Note that, in a case where there is a numerical attribute value vector for each explanatory variable, and the explanatory variables are, for example, "age" and "weight", there are a numerical attribute value vector having the numerical value of the age of each record as an element and a numerical attribute value vector having the category value of the weight of each record as an element.

The input unit 101 inputs a numerical attribute value vector of a numerical category attribute, a label value vector, and a group information vector corresponding to the numerical attribute as data required for calculating the above evaluation value of Step 4.

The rearrangement unit 102 rearranges the elements of the numeric attribute value vector and the label value vector for each group. Note that rearrangement is also called sorting.

The vector calculation unit 103 calculates a vector for determining the division condition (a first determination vector and a second determination vector to be described later) using the numerical attribute value vector and the label value vector after rearrangement.

The evaluation value calculation unit 104 calculates a frequency for evaluating the division condition for each group and for each division condition, and calculates the evaluation value (GainRatio) of the division condition on the basis of Math. 10.

The output unit 105 selects a division condition in which the evaluation value becomes maximum in each group, and outputs the selected division condition. Thereby, the division condition which is set at a node corresponding to the group is obtained.

<Hardware Configuration>

Figure 2:
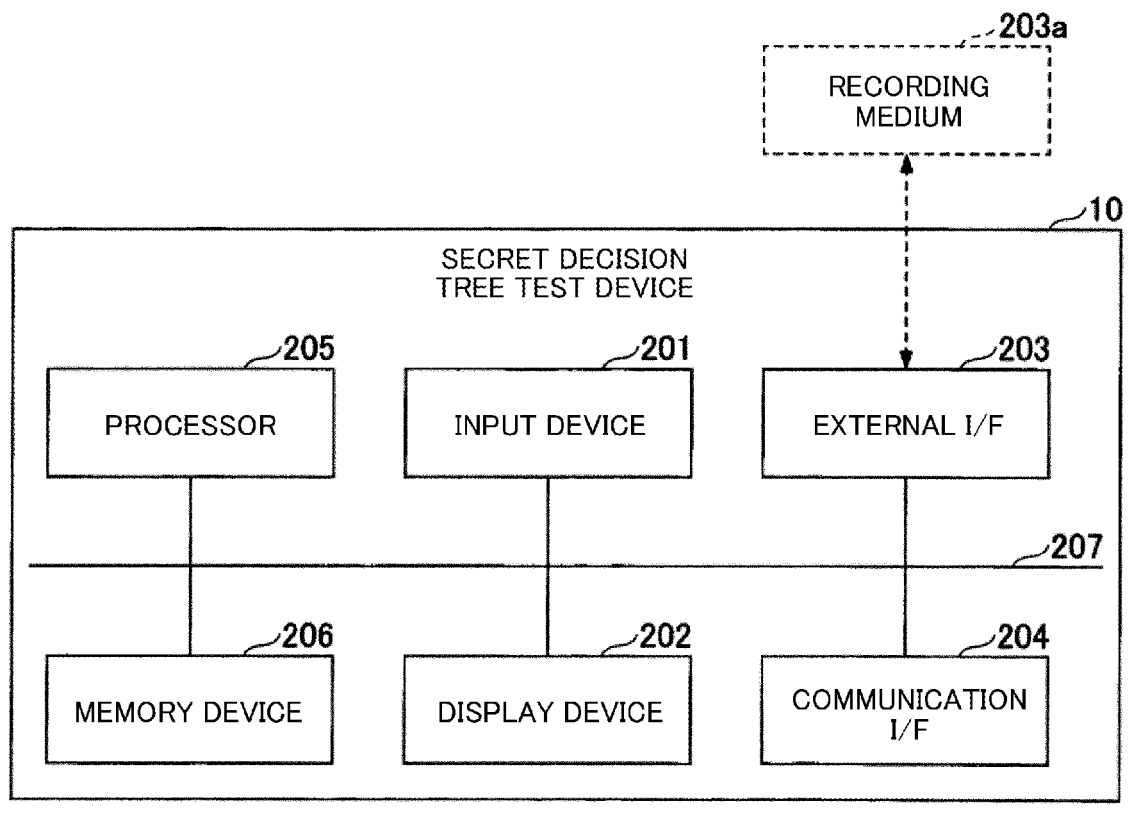
FIG. 2 is a diagram illustrating an example of a hardware configuration of the secret decision tree test device according to the present embodiment.

Next, the hardware configuration of the secret decision tree test device 10 according to the present embodiment will be described with reference to FIG. 2. FIG. 2 is a diagram illustrating an example of the hardware configuration of the secret decision tree test device 10 according to the present embodiment.

As shown in FIG. 2, the secret decision tree test device 10 according to the present embodiment is implemented by a hardware configuration of a general computer or a computer system, and includes an input device 201, a display device 202, an external I/F 203, a communication I/F 204, a processor 205, and a memory device 206. These components of hardware are communicably connected to each other through a bus 207.

The input device 201 is, for example, a keyboard, a mouse, a touch panel, or the like. The display device 202 is, for example, a display or the like. Note that the secret decision tree test device 10 may not have, for example, at least one of the input device 201 and the display device 202.

The external I/F 203 is an interface with an external device such as a recording medium 203a. The secret decision tree test device 10 can execute reading, writing, or the like on the recording medium 203a through the external I/F 203. The recording medium 203a may store, for example, one or more programs for implementing the respective functional units (the input unit 101, the rearrangement unit 102, the vector calculation unit 103, the evaluation value calculation unit 104, and the output unit 105) included in the secret decision tree test device 10.

Note that examples of the recording medium 203a include a compact disc (CD), a digital versatile disk (DVD), a secure digital (SD) memory card, a universal serial bus (USB) memory card, and the like.

The communication I/F 204 is an interface for connecting the secret decision tree test device 10 to a communication network. Note that one or more programs for implementing the respective functional units included in the secret decision tree test device 10 may be acquired (downloaded) from a predetermined server device or the like through the communication I/F 204.

Examples of the processor 205 include various arithmetic/logic units such as a central processing unit (CPU) and a graphics processing unit (GPU). Each functional unit included in the secret decision tree test device 10 is implemented by, for example, a process of causing the processor 205 to execute one or more programs stored in the memory device 206 or the like.

Examples of the memory device 206 include various storage devices such as a hard disk drive (HDD), a solid state drive (SSD), a random access memory (RAM), a read only memory (ROM), and a flash memory. The storage unit 106 included in the secret decision tree test device 10 can be implemented by using, for example, the memory device 206. Note that the storage unit 106 may be implemented by using, for example, a storage device or the like which is connected to the secret decision tree test device 10 through a communication network.

The secret decision tree test device 10 according to the present embodiment can implement various processes by having the hardware configuration shown in FIG. 2. Note that the hardware configuration shown in FIG. 2 is an example, and the secret decision tree test device 10 may have another hardware configuration. For example, the secret decision tree test device 10 may have a plurality of processors 205, or may have a plurality of memory devices 206.

<Secret Decision Tree Test Process>

Figure 3:
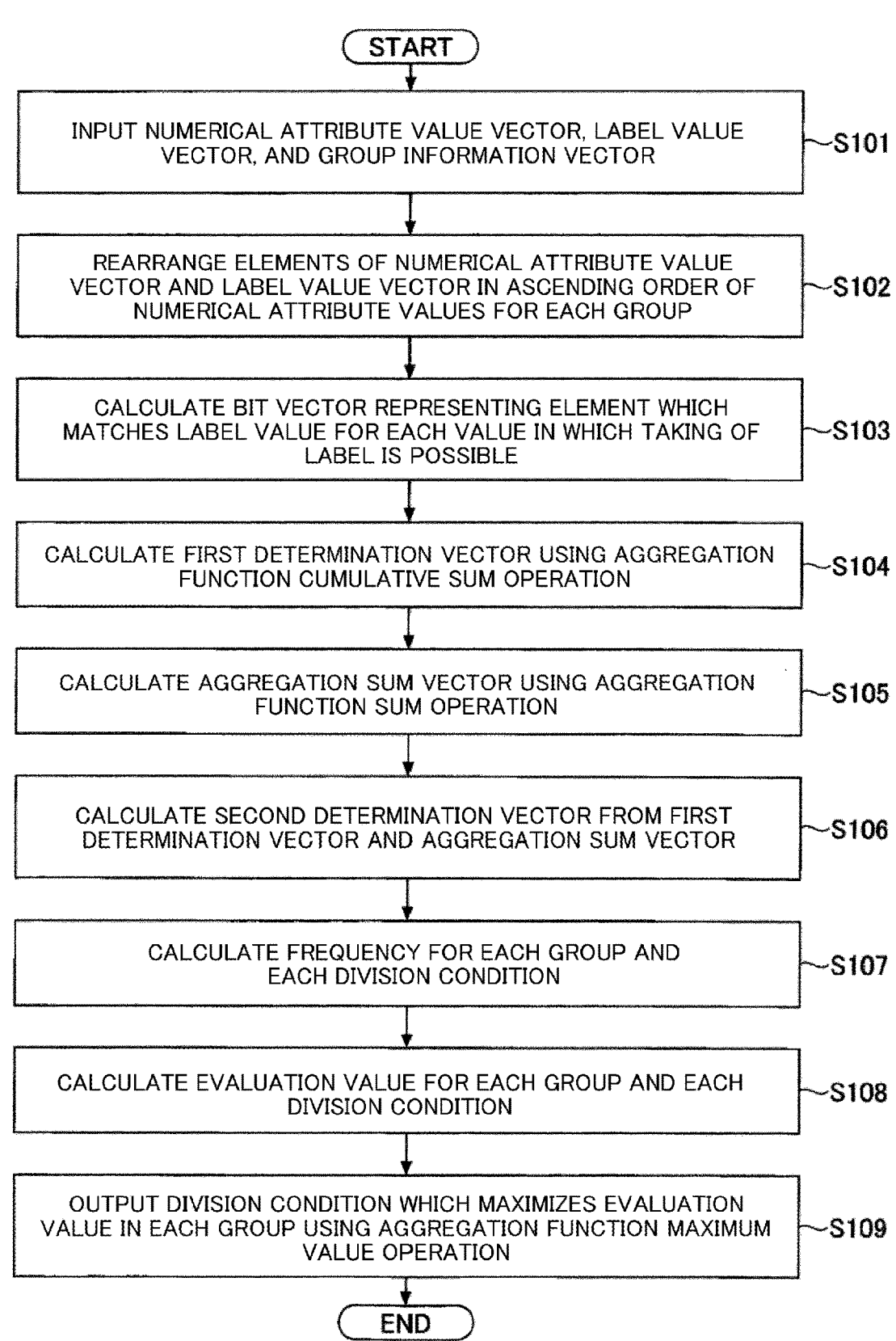
FIG. 3 is a flowchart illustrating an example of a flow of a secret decision tree test process according to the present embodiment.

Next, the secret decision tree test process for calculating the evaluation value in Steps 4 to 5 and selecting the division condition taking the maximum evaluation value will be described with reference to FIG. 3. FIG. 3 is a flowchart illustrating an example of a flow of the secret decision tree test process according to the present embodiment. Note that a case where a numerical attribute is evaluated (tested) at each node constituting a certain layer of the secret decision tree will be described below. The layer is a set of nodes having the same depth from the root. In addition, it is assumed that a set of values that can be taken by the label is {1, 2, 3}.

First, the input unit 101 inputs the numerical attribute value vector, the label value vector, and the group information vector (Step S101). Hereinafter, as an example, the group information vector is assumed to be as follows:

$$[g] = (0, 0, 1, 1, 0, 0, 0, 1, 0, 1)^T$$

where T is a symbol denoting transposition.

The group information vector indicates which group each element of the numerical attribute value vector and the label value vector is classified into, and is a vector in which an element indicating the end of each group is 1 and the other elements are 0 when classified into groups from an element at the head. For example, the above [g] indicates that the first to third elements of the numerical attribute value vector and the label value vector belong to the first group, the fourth element belongs to the second group, the fifth to eighth elements belong to the third group, and the ninth and tenth elements belong to the fourth group.

Note that each group corresponds to one node and is a set of elements (numerical attribute values) classified at the node in the layer one level above (that is, data sets divided by the division condition set at the node in the layer one level above).

Next, the rearrangement unit 102 rearranges the elements of the numeric attribute value vector and the label value vector in ascending order within the same group for each group (Step S102). That is, the rearrangement unit 102 rearranges the elements of the numeric attribute value vector and the label value vector in ascending order within each of the first to fourth groups. In the following, as an example, it is assumed that the numerical attribute value vector after this rearrangement is as follows:

$$[c] = (1, 2, 5, 2, 3, 4, 5, 7, 2, 4)^T$$

In addition, it is assumed that the label value vector after the rearrangement is as follows:

$$[y] = (3, 2, 1, 3, 2, 1, 1, 3, 1, 2)^T$$

In the following, it is assumed that the numerical attribute value vector and the label value vector refer to the rearranged numerical attribute value vector and label value vector.

Next, the vector calculation unit 103 calculates a bit vector indicating the position of an element that matches the label value among the elements of the label value vector [y] for each value that can be taken as the label (step S103).

Denoting bit vectors corresponding to the values of "1", "2", and "3" that can be taken as the label as $[f_1]$, $[f_2]$, and $[f_3]$, these bit vectors are as follows:

$$[f_1] = (0, 0, 1, 0, 0, 1, 1, 0, 1, 0)^T$$
$$[f_2] = (0, 1, 0, 0, 1, 0, 0, 0, 0, 1)^T$$
$$[f_3] = (1, 0, 0, 1, 0, 0, 0, 1, 0, 0)^T$$

That is, a bit vector corresponding to a certain label value is a vector in which only an element at the same position as the element corresponding to the label value among the elements of the label value vector is set to 1, and the other elements are set to 0.

Next, the vector calculation unit 103 performs an aggregation function cumulative sum operation for each bit vector according to grouping by the group information vector [g], to calculate the first determination vector (Step S104). Here, the aggregation function cumulative sum operation is an operation of inputting a set of elements in the same group and outputting a set of cumulative sums of the values of the elements. In other words, the aggregation function cumulative sum operation is an operation of calculating the cumulative sum from the beginning for the elements in the same group.

For example, the vector calculation unit 103 calculates the cumulative sum of the first element to the third element in order for each of the bit vectors, and similarly calculates the cumulative sum of the fourth element, calculates the cumulative sum of the fifth element to the eighth element in order, and calculates the cumulative sum of the ninth element to the tenth element in order.

Accordingly, a first determination vector corresponding to the bit vector $[f_1]$ is obtained as follows:

$$[s_{0,1}] = (0, 0, 1, 0, 0, 1, 2, 2, 1, 1)^T$$

12

Similarly, a first determination vector corresponding to the bit vector $[f_2]$ is obtained as follows:

$$[s_{0,2}] = (0, 1, 1, 0, 1, 1, 1, 1, 0, 1)^T$$

Similarly, a first determination vector corresponding to the bit vector $[f_3]$ is obtained as follows:

$$[s_{0,3}] = (1, 1, 1, 1, 0, 0, 0, 1, 0, 0)^T$$

When a threshold value is set immediately after each numerical attribute value in each group (that is, between the numerical attribute value and the next greatest numerical attribute value), the first determination vector indicates the number (frequency) of numerical attribute values being less than or equal to the threshold value and having a corresponding label value. For example, when the threshold value is set immediately after the first element of the first group of the numerical attribute value vector [c], the first determination vector $[s_{0,1}]$ indicate that the number of numerical attribute values being less than or equal to the threshold value and having a level value of 1 is 0. Similarly, for example, when the threshold value is set immediately after the third element of the first group, it indicates that the number of numerical attribute values being less than or equal to the threshold value and having a level value of 1 is 1.

Therefore, by the first determination vectors described above, it is possible to calculate the frequency of records taking a label value k in the data set satisfying the division condition among data sets (sets of numerical attribute values) divided (grouped) by the division condition expressed in a form of x≤C (where C is a threshold value).

Next, the vector calculation unit 103 performs an aggregation function total sum operation according to grouping by the group information vector [g] for each bit vector, to calculate an aggregation total sum vector (Step S105). Here, the aggregation function total sum operation is an operation of inputting a set of elements in the same group and outputting the total sum of the values of the elements.

For example, the vector calculation unit 103 calculates a total sum of the first to third elements, similarly calculates a total sum of the fourth element, calculates a total sum of the fifth to eighth elements, and calculates a total sum of the ninth to tenth elements for each bit vector. Then, the vector calculation unit 103 creates an aggregation total sum vector by setting each total sum as an element at the same position as an element that is a calculation source of the total sum.

Thus, an aggregation total sum vector corresponding to the bit vector $[f_1]$ is obtained as follow:

$$[s_{*,1}] = (1, 1, 1, 0, 2, 2, 2, 2, 1, 1)^T$$

Similarly, an aggregation total sum vector corresponding to the bit vector $[f_2]$ is obtained as follow:

$$[s_{*,2}] = (1, 1, 1, 0, 1, 1, 1, 1, 1, 1)^T$$

65

Similarly, an aggregation total sum vector corresponding to the bit vector [$f_3$] is obtained as follow:

$$[s_{*,3}] = (1, 1, 1, 1, 1, 1, 1, 1, 0, 0)^T$$

Next, the vector calculation unit 103 calculates a second determination vector corresponding to the label value by using the first determination vector and the aggregation total sum vector corresponding to the same label value (Step S106). The vector calculation unit 103 calculates the second determination vector by subtracting the first determination vector from the aggregation total sum vector by using the first determination vector and the aggregation total sum vector corresponding to the same label value.

Thus, the second determination vector corresponding to the label value "1" is obtained as follow:

$$[s_{1,1}] = [s_{*,1}] - [s_{0,1}] = (1, 1, 0, 0, 2, 1, 0, 0, 0, 0)^T$$

Similarly, the second determination vector corresponding to the label value "2" is obtained as follow:

$$[s_{1,2}] = [s_{*,2}] - [s_{0,2}] = (1, 0, 0, 0, 0, 0, 0, 0, 1, 0)^T$$

Similarly, the second determination vector corresponding to the label value "3" is obtained as follow:

$$[s_{1,3}] = [s_{*,3}] - [s_{0,3}] = (0, 0, 0, 0, 1, 1, 1, 0, 0, 0)^T$$

When the threshold value is set immediately after each numerical attribute value in each group (that is, between the numerical attribute value and the next greatest numerical attribute value), the second determination vector indicates the number (frequency) of numerical attribute values being greater than the threshold value and having a corresponding label value. For example, when the threshold is set immediately after the first element of the first group of the numerical attribute value vector [c], the second determination vector [$s_{1,1}$] indicates that the number of numerical attribute values being greater than the threshold value and having a level value of 1 is 1. Similarly, for example, when the threshold value is set immediately after the third element of the first group, it indicates that the number of numerical attribute values being greater than the threshold value and having a level value of 1 is 0.

Therefore, by the second determination vectors, it is possible to calculate the frequency of records taking the label value k in the data set not satisfying the division condition among the data set (the set of numerical attribute values) divided (grouped) by the division condition expressed in the form of x≤C (where C is the threshold value).

Next, the evaluation value calculation unit 104 calculates each frequency for each group and for each division condition (Step S107). Here, the evaluation value calculation unit 104 calculates the following four frequencies:

the number of elements in each group of the numerical attribute value vector [c] (that is, |Q| shown in the above (1));

the number of elements of the label value k in each group of the numerical attribute value vector [c] (that is, $|Q_k|$ shown in the above (2));

the number of elements in each group obtained by dividing the group of the numerical attribute value vector [c] by the division condition $\theta$ (that is, $|Q(\theta, i)|$ shown in the above (3)); and the number of elements of the label value k in each group obtained by dividing the group of the numerical attribute value vector [c] by the division condition $\theta$ (that is, $|Q(\theta, i)_k|$ shown in the above (4)).

Among these four frequencies, the first frequency is obtained by calculating the number of elements for each group using the numerical attribute value vector [c] and the group information vector [g]. In addition, the second frequency is obtained by calculating the number of elements for each group and for each label value using the numerical attribute value vector [c], the label value vector [y], and the group information vector [g]. In addition, the third frequency is obtained by calculating the number of elements of each set (that is, a set satisfying the division condition $\theta$ or a set not satisfying it) divided by the division condition $\theta$ when the threshold value of the division condition $\theta$ is set in the group by using the numerical attribute value vector [c] and the group information vector [g].

Meanwhile, the fourth frequency is obtained by calculating the number of elements taking the label value k in each set divided by the division condition $\theta$ in the group when the threshold value of the division condition $\theta$ is set in the group by using the numerical attribute value vector [c], the group information vector [g], the first determination vector, and the second determination vector. As described above, the number of elements taking the label value k in the set satisfying the division condition $\theta$ among the respective sets after division is calculated by the first determination vector corresponding to the label value k, and the number of elements taking the label value k in the set not satisfying the division condition $\theta$ is calculated by the second determination vector corresponding to the label value k.

Next, the evaluation value calculation unit 104 calculates the evaluation value of the division condition on the basis of Math. 10 for each group and for each division condition using each frequency calculated in Step S107 (Step S108).

Then, the output unit 105 selects a division condition that maximizes the evaluation value in each group, and outputs the selected division condition as the division condition set at a node corresponding to the group (Step S109). Note that, when selecting the division condition that maximizes the evaluation value in each group, for example, an aggregation function maximum value operation may be performed. The aggregation function maximum value operation is an operation of inputting elements (evaluation values) in the same group and outputting the maximum value among the values of the elements.

CONCLUSION

As described above, when learning a secret decision tree from a given data set of secret values, the secret decision tree test device 10 according to the present embodiment can reduce the total calculation time by collectively calculating the evaluation values of a plurality of division conditions at each node for the numerical attribute value. Specifically, for example, in a case where a data set composed of n items of data is divided by a decision tree having m nodes, evaluations (tests) of $\Theta(mn^2)$ is required as a whole with the conventional technique, whereas the secret decision tree test device 10 according to the present embodiment can make evaluation in O(n log n) time.

The present invention is not limited to the above-described embodiment specifically disclosed, and various modifications, changes, combinations with known techniques, and the like are possible without departing from the description of the claims.

REFERENCE SIGNS LIST

10 Secret decision tree test device
101 Input unit
102 Rearrangement unit
103 Vector calculation unit
104 Evaluation value calculation unit
105 Output unit
106 Storage unit
201 Input device
202 Display device
203 External I/F
203*a* Recording medium
204 Communication I/F
205 Processor
206 Memory device
207 Bus

The invention claimed is:

1. A secret decision tree test device configured to evaluate a division condition at each of a plurality of node of a decision tree when learning of the decision tree is performed by secret calculation, the secret decision tree test device comprising:

a memory; and a processor configured to execute:

inputting a numerical attribute value vector composed of specific numerical attribute values of items of data included in a data set for learning of the decision tree, the specific numerical attribute values including three or more mutually different numerical attribute values that provide a plurality of threshold candidates, a label value vector composed of label values of the items of data, and a group information vector indicating grouping of the items of the data into the nodes;

calculating, using the numerical attribute value vector, the label value vector, and the group information vector, a first frequency of data belonging to each group, a second frequency of data for each of the label values in said each group, a third frequency of data belonging to a division group obtained by dividing said each group by a division condition indicating comparison between the numerical attribute value and a threshold value selected from the plurality of threshold candidates, and a fourth frequency of data for each of the label values in the division group; and calculating an evaluation value for evaluating the division conditions using the first frequency, the second frequency, the third frequency, and the fourth frequency.

2. The secret decision tree test device according to claim 1, wherein the processor calculates the third frequency and the fourth frequency in each of a plurality of the division conditions for said each group.

3. The secret decision tree test device according to claim 1, wherein the processor further executes rearranging numerical attribute values included in the numerical attribute value vector and label values included in the label value vector in ascending order of the numerical attribute values for said each group indicated in the group information vector;

creating, for each value that can be taken by the label value, a bit vector indicating a position of a label value that matches the value that can be taken by the label value, among the label values included in the label value vector;

calculating a first determination vector for determining a number of data items of numerical attribute values being less than or equal to the threshold value by performing an aggregation function cumulative sum operation of elements included in the bit vector for said each group indicated in the group information vector; and calculating a second determination vector for determining a number of data items of numerical attribute values being greater than the threshold value by using the first determination vector and the bit vector, wherein the processor calculates the fourth frequency using the first determination vector and the second determination vector.

4. The secret decision tree test device according to claim 3, wherein the processor calculates a total vector which is an element of a total for each group and calculates the second determination vector by subtracting the first determination vector from the total vector by performing an aggregate function summation operation of each element included in the bit vector in accordance with a group represented by the group information vector.

5. A secret decision tree test system configured to evaluate a division condition at each of a plurality of nodes of a decision tree when learning of the decision tree is performed by secret calculation, the secret decision tree test system comprising:

a computer including a memory and a processor configured to execute:

inputting a numerical attribute value vector composed of specific numerical attribute values of each items of data included in a data set for learning of the decision tree, the specific numerical attribute values including three or more mutually different numerical attribute values that provide a plurality of threshold candidates, a label value vector composed of label values of the items of data, and a group information vector indicating grouping of the items of data into the nodes;

calculating, using the numerical attribute value vector, the label value vector, and the group information vector, a first frequency of data belonging to each group, a second frequency of data for each of the label values in said each group, a third frequency of data belonging to a division group obtained by dividing said each group by a division condition indicating comparison between the numerical attribute value and a threshold value selected from the plurality of threshold candidates, and a fourth frequency of data for each of the label values in the division group; and calculating an evaluation value for evaluating the division condition using the first frequency, the second frequency, the third frequency, and the fourth frequency.

6. A non-transitory computer-readable recording medium having computer-readable instructions stored thereon, which when executed, cause a computer to function as the secret decision tree test device according to claim 1.

7. A secret decision tree test method of evaluating a division condition at each of a plurality of nodes of a decision tree when learning of the decision tree is performed by secret calculation, executed by a computer including a memory and a processor, the secret decision tree test method comprising:

inputting a numerical attribute value vector composed of specific numerical attribute values of items of data included in a data set for learning of the decision tree, the specific numerical attribute values including three or more mutually different numerical attribute values that provide a plurality of threshold candidates, a label value vector composed of label values of the items of data, and a group information vector indicating grouping of the items of the data into the nodes;

calculating, using the numerical attribute value vector, the label value vector, and the group information vector, a first frequency of data belonging to each group, a second frequency of data for each of the label values in said each group, a third frequency of data belonging to a division group obtained by dividing said each group by a division condition indicating comparison between the numerical attribute value and a threshold value selected from the plurality of threshold candidates, and a fourth frequency of data for each of the label values in the division group; and calculating an evaluation value for evaluating the division condition using the first frequency, the second frequency, the third frequency, and the fourth frequency.

* * * * *